United States Patent [19]

Koellermeyer et al.

[11] Patent Number: 5,501,641
[45] Date of Patent: Mar. 26, 1996

[54] MOTOR VEHICLE GEAR WHEEL CHANGE TRANSMISSION WITH A RETARDER BRAKE

[75] Inventors: Albrecht Koellermeyer, Althuette; Detlef Schnitzer, Denkendorf, both of Germany

[73] Assignee: Mercedes-Benz AG, Germany

[21] Appl. No.: 277,280

[22] Filed: Jul. 21, 1994

[30] Foreign Application Priority Data

Jul. 21, 1993 [DE] Germany .......................... 43 24 460.2

[51] Int. Cl.$^6$ .............................. F16H 3/56; F16H 37/04; F16H 47/08; F16D 57/00
[52] U.S. Cl. ............................... 475/107; 475/113
[58] Field of Search .................... 475/104, 107, 475/113

[56] References Cited

U.S. PATENT DOCUMENTS

| | | | |
|---|---|---|---|
| 3,023,637 | 3/1962 | DeLorean | 475/113 X |
| 3,075,410 | 1/1963 | Weinrich et al. | 475/113 X |
| 3,527,121 | 9/1970 | Moore | 74/761 |
| 3,667,324 | 6/1972 | Laing | 74/801 |
| 4,986,800 | 1/1991 | Meffert et al. | 475/113 |

FOREIGN PATENT DOCUMENTS

| | | |
|---|---|---|
| 1780591 | 7/1970 | Germany . |
| 3536928 | 4/1986 | Germany . |
| 3837142 | 5/1989 | Germany . |
| 4140979 | 6/1993 | Germany . |
| 475297 | 6/1975 | U.S.S.R. ................ 475/107 |
| 2109488 | 6/1983 | United Kingdom . |

*Primary Examiner*—Charles A. Marmor
*Assistant Examiner*—Nathan O. Jensen
*Attorney, Agent, or Firm*—Evenson, McKeown, Edwards & Lenahan

[57] ABSTRACT

A gear wheel change transmission comprises a basic transmission and an auxiliary transmission of planetary wheel construction which is situated in series in the power flux. A retarder brake is geared up by the planet carrier of the auxiliary transmission via a power take-off with a planetary gear.

2 Claims, 1 Drawing Sheet

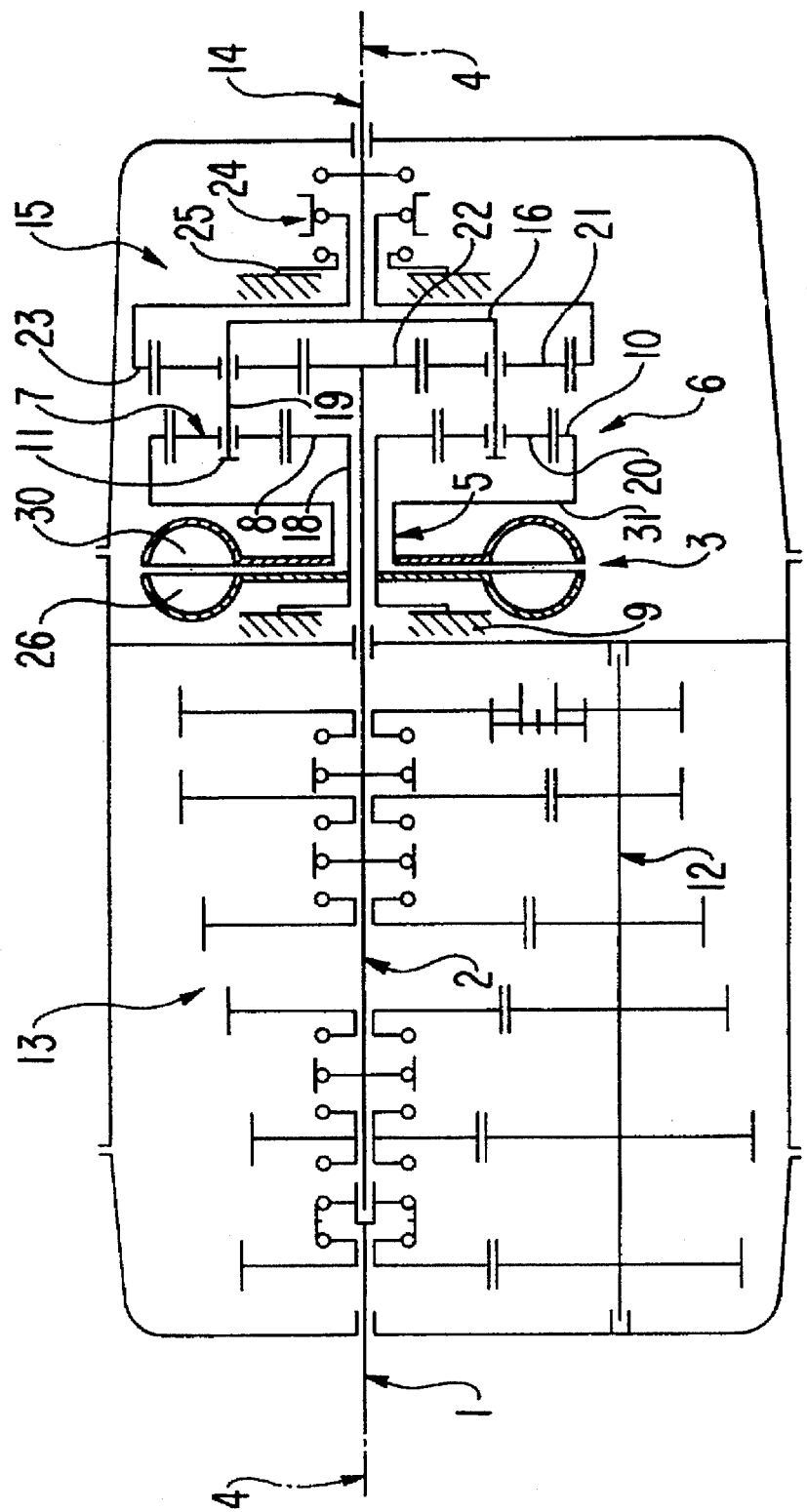

MOTOR VEHICLE GEAR WHEEL CHANGE TRANSMISSION WITH A RETARDER BRAKE

BACKGROUND AND SUMMARY OF THE INVENTION

The present invention relates to a gear wheel change transmission and, more particularly, to a motor vehicle gear wheel countershaft construction transmission comprising an input shaft, a main shaft coaxial to the input shaft and having a retarder brake with a drive shaft situated centrically to a braking rotation axis, in a driving connection with the main shaft via a power take-off with a planetary gear, with one central wheel of the planetary gear of the power take-off being connected with the non-rotating housing, another central wheel being connected with the drive shaft of the retarder brake, and the planet carrier being in driving connection with the main shaft.

In a gear wheel change transmission of the type shown in German Patent DE 38 37 142 A1, the braking axis of rotation of the retarder brake and the central axis of the planetary gear of the power take-off are arranged coaxially with respect to the countershaft of a single-range transmission. The planet carrier is driven via a gear wheel position as a component of the power take-off by the main shaft which is in parallel to the countershaft and is the output shaft of the gear wheel change transmission. The power take-off with the output-side gear wheel of its gear wheel position, the planetary gear of the power take-off as well as the retarder brake for which a hydrodynamic brake or retarder is used are housed in a special stator housing which is provided on the output-side lower housing end area of the transmission housing of the gear wheel change transmission. As a result, the required free moving space is limited when the gear wheel change transmission is used for driving an eight wheeler and the possibility is eliminated of mounting retarder-independent power take-offs in the rear on the transmission housing.

These disadvantages exist also in the case of a known gear wheel change transmission of the type shown in German Patent DE 35 36 928 A1 which has a planet wheel range-change transmission as a multirange transmission. The inner planet wheel is connected with the input shaft and the planet carrier is connected with the output shaft of the gear wheel change transmission. The outer planet wheel via a change-over device can be fixed in a non-rotatable manner either with respect to the output shaft or with respect to the transmission housing. The braking rotation axis of the retarder brake with the pertaining coaxial drive shaft are arranged parallel to the output shaft and are accommodated in a special housing which is joined to the rearward lower housing end portion of the transmission housing of the gear wheel change transmission. In the case of this known gear wheel change transmission, the power take-off for the retarder brake does not have a planetary gear.

In the gear wheel change transmission shown in British Patent GB-A 21 09 488 for a motor vehicle having a primary retarder which can be used as a retarder brake, a transfer case is arranged in the power flux between a driving engine and a main transmission. The transfer case comprises a two-speed planetary gear and a hydrodynamic primary retarder. The constructional arrangement is such that the output shaft of the driving engine and the main axis of rotation of the planetary gear as well as the braking axis of rotation of the primary retarder are each situated coaxially with respect to the input shaft of the main transmission. The planetary carrier is non-rotatably connected with the central output shaft of the transfer case and is connected with the output shaft of the driving engine by a drive-through clutch which can be engaged and disengaged. The outer central wheel of the planetary gear is connected with the output shaft of the driving engine by a gear clutch which can be engaged and disengaged, and can be braked by a gear brake which can be engaged and disengaged. The inner central wheel is non-rotatably connected with a hollow shaft which, penetrated by the output shaft of the transfer case, is connected with a gear brake which can be engaged and disengaged as well as with the rotor of the primary retarder.

The primary retarder has a two functions. First, in the start-up phase from the stopped condition of the vehicle, only the gear clutch is engaged which connects the central wheel with the output shaft of the driving engine so that the primary retarder operates in a rotating direction opposite to the rotating direction of the output shaft of the driving engine as a retarder brake on the inner central wheel, which is used as a transmission reaction. Second, in the coasting operation of the motor vehicle, the outer central wheel can be separated by the disengagement of its gear clutch from the driving engine and can be braked by the engagement of its gear brake. In this retarder braking operation, the rotor is geared up by the planetary gear from the direction of the main transmission, specifically in a rotating direction which is the same as the rotating direction of the output shaft of the driving engine. It is a disadvantage that the rotational speed of the rotor is a function of the engaged gear of the main transmission and that greater efficiency of the rotor is bad for the retarder operation because the blading must also be designed for the braking effect in the opposite direction when it is used as a retarder brake in the start-up phase.

German Patent DE 41 40 979 A1 describes a known vehicle driving device of a different type which is provided with a hydrostatic-mechanical torque division transmission between the driving engine and the axle transmission line, with an at least four-shaft planetary differential comprising at least two rows of planet gears, two sun gears, a web and a ring gear. Also, two main shafts form the input and the output and are respectively connected to different shafts of the planetary differential, and at least two hydrostatic machines are each, in at least one operating range, connected to a separate shaft of the planetary differential and operate alternately as a pump or as a motor. At least one of the hydrostatic machines, while the other hydrostatic machine is at least approximately stopped, during the transition from one into the other operating range, can be switched over via at least one shiftable clutch from the output-side main shaft to the non-drive-side sun gear and changed in the drive operation from the motor function to the pump function.

It is stated that this known driving arrangement is to be different from a conventional hydrodynamic primary retarder which weighs approximately 40 kg and requires additional installation space, particularly in the longitudinal direction. A relatively low rotational speed of a magnitude of up to approximately 2,000 rpm. would then be available for the drive of the retarder; in addition, such a primary retarder is comparatively expensive. In the known driving device, it was therefore attempted to provide a retarder which avoids the disadvantages of a retarder of conventional construction and arrangement. For this purpose, the rotor of a hydrodynamic retarder was connected to the shaft of the non-drive-side sun gear or connected by a clutch. This approach was supposed to be based on the knowledge that a significantly higher rotational speed is supposed to be available on the shaft of the non-drive-side sun gear of the torque division transmission than on the input or output shaft of the torque division transmission. It is stated that this retarder can be installed directly in the housing of the torque division transmission or physically in front between it and the internal-combustion engine.

An object of the present invention consists essentially in providing a multirange transmission comprising a retarder brake, in which the retarder brake is geared up regardless of the gear speed as well as with respect to the rotational speed of the output shaft and, because of its arrangement, does not interfere with the use of braking-independent power take-offs.

This object has been achieved according to the present invention by providing that the braking rotation axis is coaxial with respect to a rotation axis of the main shaft and the retarder brake, which together with the planetary gearset of the power take-off, is operatively arranged between a basic transmission comprising the input shaft as a transmission input, at least one countershaft and the main shaft as a transmission output on one side and an auxiliary transmission of planet wheel construction on the other side. The auxiliary transmission is situated in a transmission power flux in series between the main shaft and a coaxially arranged output shaft. A non-rotatable driving connection is provided between the planet carrier of the planetary gearset of the power take-off and the planet carrier of the auxiliary transmission, and a hollow shaft penetrated by the main shaft constitutes a connection between a central wheel of the planetary gearset of the power take-off and the retarder brake.

In the gear wheel change transmission according to the present invention, a secondary retarder is arranged between the planet carrier of the auxiliary transmission and the main shaft of the basic transmission, and is geared up by way of a planetary train. The secondary retarder can be arranged in a housing center portion of the transmission housing which also accommodates the basic transmission. The power take-off for this secondary retarder takes place via a planetary train which is driven at the rotational drive shaft speed by the planet carrier of the auxiliary transmission which is connected with the output shaft. The rotor of the secondary retarder can be connected with the outer central wheel of the planetary gearset of the power take-off. The stator of the secondary retarder and the inner central wheel of the planetary gear are connected with one another and fixed to the housing. Thus, a gear ratio of i=1+ (number of teeth of the inner central wheel)/(number of teeth of the outer central wheel) is obtained. In one currently preferred embodiment, a geared up gear ratio of i≅1.4 can be implemented. However, another arrangement may also be implemented in that the outer central wheel is arranged to be fixed to the housing and the rotor of the secondary retarder is connected with the inner central wheel. The gear ratio will now be i=1+ (number of teeth of the outer central wheel)/(number of teeth of the inner central wheel). In another embodiment, a geared-up gear ratio of i≅3.5 can be achieved.

The charging of oil to the secondary retarder may take place by oil from the lubricating oil circulating system of the gear wheel change transmission via ducts of the center portion of the housing.

Furthermore, in the gear wheel change transmission according to the present invention, a compact construction and sufficient free moving space for all power take-offs and eight wheelers is achieved, with the compact construction also resulting in a weight advantage. Naturally, because of its drive from the direction of the output shaft, the braking torque of the secondary retarder is independent of the engaged gear speed. It is also possible to operate the retarder brake without any driving-up.

BRIEF DESCRIPTION OF THE SOLE FIGURE

These and other objects, features and advantages of the present invention will become more readily apparent from the following detailed description thereof when taken in conjunction with the accompanying sole figure which is a schematic cross-sectional view of a gear wheel change transmission in accordance with the present invention.

DETAILED DESCRIPTION OF THE SOLE FIGURE

A gear wheel change transmission of the multirange type comprises essentially a basic transmission 13 having an input shaft 1 which can be driven from the direction of a driving engine, a main shaft 2 which forms the transmission output of the basic transmission, and a countershaft 12. The construction and method of operation of such a countershaft transmission are generally known and are not shown in further detail in the drawing.

An auxiliary transmission 15 of planet gear construction is arranged in the power flux between the main shaft 2 of the basic transmission 13 and a coaxial output shaft 14 of the gear wheel change transmission which, in a known manner, can be brought into a driving connection with at least one drivable vehicle axle. In the auxiliary transmission 15, a planet carrier 16 is constructed in one piece with the output shaft 14, an inner central wheel 22 is non-rotatably or fixedly connected with the main shaft 2, and an outer gear wheel 23 is, in each case, non-rotatably fixed by a conventional change-over device 24 either with respect to the output shaft 14 or with respect to a brake plate 25 fixed to the housing.

From a constructional point of view, a retarder brake, e.g. a so-called hydrodynamic secondary retarder 3, is axially arranged between the basic transmission 13 and the auxiliary transmission 15. The braking rotation axis of the secondary retarder 3, the rotational axis of the main shaft 2, the central axis of the auxiliary transmission 15, and the rotation axis of the output shaft 14 each are aligned coaxially with respect to a geometrical axis 4—4.

The housing of the secondary retarder 3 is divided into two parts. The stator 26 is constructed in one piece with one housing half held fixedly with respect to movements in an assembly housing 9 which, in turn, is stationarily held in a center portion of the transmission housing of the gear wheel change transmission. The second housing half, which is connected with the first housing half in a fixed manner with respect to movements and in a liquid-tight condition, surrounds the rotor 30 which is constructed in one piece with a hollow shaft 5 which is concentric to the axis 4—4 and which accordingly represents the drive shaft of the retarder brake.

The drive shaft 5 of the secondary retarder 3 is driven by the output shaft via a power take-off 6 with a planetary gearset 7. For that purpose, a stationary hollow shaft 18 is arranged concentrically with respect to the axis 4—4 and also concentrically between the main shaft 2 and the drive shaft 5. The inner central wheel 8 of the planetary gearset 7 is constructed in one piece with the hollow shaft 18 which, in turn, is non-rotatably fixed to the housing half constructed in one piece with the stator 26. The drive shaft 5 is fixedly connected with respect to movements with a driving web 31 which has an L-shaped cross-section and which is constructed in one piece with the outer central wheel 10 of the planetary gearset 7. The central wheels 8 and 10 mate with the planet wheels 20 which, together with planet wheels 21 which are part of the auxiliary transmission 15 and mate with the central wheels 22 and 23, are rotatably disposed side-by-side on bearing pins 19. The planet wheels 20 can rotate relative to the planet wheels 21. One pin end of each bearing pin 19 is fixed with respect to movements on a ring-shaped planet carrier 11 of the planetary gearset 7 and, on their other pin end, are fixed with respect to movements to the flange-type planet carrier 16 of the auxiliary transmission 15.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A motor vehicle gear wheel change transmission of the countershaft construction, comprising an input shaft, a main shaft coaxial to the input shaft and a retarder brake with a drive shaft situated centrically to a braking rotation axis in a driving connection with the main shaft via a power take-off with a planetary gearset, and with one central wheel of the planetary gearset of the power take-off connected with a non-rotating housing and another central wheel connected with the drive shaft of the retarder brake, and the planet carrier in a driving connection with the main shaft, wherein the braking rotation axis is coaxial with respect to a rotation axis of the main shaft, and the retarder brake and the planetary gearset of the power take-off are operatively arranged between a basic transmission comprising the input shaft as a transmission input, at least one countershaft and the main shaft as a transmission output on one side and an auxiliary transmission of planet wheel construction situated on the other side, said auxiliary transmission being in a transmission power flux in series between a main shaft and a coaxially arranged output shaft, and a non-rotatable driving connection is provided between the planet carrier of the planetary gearset of the power take-off and the planet carrier of the auxiliary transmission, and a hollow shaft through which the main shaft passes constitutes a connection between a central wheel of the planetary gearset of the power take-off and the retarder brake and further wherein the hollow shaft is fixedly connected with a stator of the retarder brake and with a central wheel of the planetary gearset of the power take-off, the other central wheel of the planetary gearset of the power take-off being non-rotatably connected with a rotor of the retarder brake, and planet wheels of the planetary gearset being rotatably arranged relative to planet wheels of the auxiliary transmission.

2. The gear wheel change transmission according to claim 1, wherein the respective planet carriers of the power take-off and the auxiliary transmission have common bearing pins on which the respective planet wheels are arranged side-by-side.

* * * * *